United States Patent
Campton et al.

(10) Patent No.: US 10,883,555 B2
(45) Date of Patent: Jan. 5, 2021

(54) CENTRIFUGAL FORCE RESPONSIVE J-SHAPED PAWL FOR CLUTCH

(71) Applicant: BorgWarner Inc., Auburn Hills, MI (US)

(72) Inventors: Calahan Campton, Royal Oak, MI (US); Brett Peglowski, Oakland, MI (US); James Bourn, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 148 days.

(21) Appl. No.: 16/360,464

(22) Filed: Mar. 21, 2019

(65) Prior Publication Data

US 2019/0293131 A1    Sep. 26, 2019

Related U.S. Application Data

(60) Provisional application No. 62/647,329, filed on Mar. 23, 2018.

(51) Int. Cl.

| F16D 41/12 | (2006.01) |
| F16D 11/02 | (2006.01) |
| F16D 41/06 | (2006.01) |
| F16D 41/069 | (2006.01) |

(52) U.S. Cl.
CPC .............. *F16D 41/12* (2013.01); *F16D 11/02* (2013.01); *F16D 41/069* (2013.01)

(58) Field of Classification Search
None
See application file for complete search history.

(56) References Cited

U.S. PATENT DOCUMENTS

| 4,899,534 A * | 2/1990 | Sorenson ................ F02C 7/277 192/45.1 |
| 5,971,122 A | 10/1999 | Costin et al. |
| 6,338,403 B1 | 1/2002 | Costin et al. |
| 6,814,200 B2 | 11/2004 | Stefina |
| 7,383,930 B2 | 6/2008 | Kimes et al. |
| 7,451,862 B2 | 11/2008 | Kimes et al. |
| 7,455,156 B2 | 11/2008 | Kimes et al. |
| 7,455,157 B2 | 11/2008 | Kimes et al. |
| 7,484,605 B2 * | 2/2009 | Pawley ................... F16D 41/14 192/43.1 |

(Continued)

*Primary Examiner* — Colby M Hansen
(74) *Attorney, Agent, or Firm* — Miller, Matthias & Hull LLP

(57) ABSTRACT

A one-way ratchet overrunning clutch includes first and second concentric races, the first race having pockets configured to contain pawls, each pocket including a boss having an exterior convex surface defining an arc of about 180°. Each pawl is supported on one boss, and is adapted to ratchet about the boss to selectively lock the races together. Each pawl has a J-shaped body including a pair of legs joined by a hook portion that with one of the legs defines a concave surface. The concave surface is configured to partially engage a complementary exterior convex surface of a corresponding boss, and the concave surface defines an arc ranging from 90° to at least 150° adapted to circumscribe an identical range of the convex surface of the corresponding boss. The interactive convex and concave surfaces of respective pawl and boss elements provide an effective pawl retention system under centrifugal forces.

15 Claims, 4 Drawing Sheets

(56) References Cited

U.S. PATENT DOCUMENTS

| | | | | |
|---|---|---|---|---|
| 8,091,696 B2* | 1/2012 | Wittkopp | ............... | F16D 41/16 |
| | | | | 192/43.1 |
| 10,316,904 B2* | 6/2019 | Hand | ...................... | F16D 41/14 |
| 2007/0131509 A1* | 6/2007 | Kimes | ..................... | F16D 41/12 |
| | | | | 192/46 |
| 2008/0093189 A1* | 4/2008 | Wiesneth | ............ | F16F 15/1202 |
| | | | | 192/45.1 |

* cited by examiner

CENTRIFUGAL FORCE RESPONSIVE J-SHAPED PAWL FOR CLUTCH

CROSS-REFERENCE TO RELATED APPLICATIONS

This application claims the benefit of U.S. Patent Application No. 62/647,329 filed on Mar. 23, 2018, the disclosure of which is herein incorporated by reference in its entirety.

TECHNICAL FIELD

The present disclosure relates to overrunning clutches, and more particularly to clutch pawls configured for engagement and disengagement of adjacent clutch races by action of centrifugal forces on the pawls.

BACKGROUND

Ratchet clutch assemblies are often preferred for use in overrunning clutches. Typically, such assemblies include pawls for increased load capacities in smaller clutch package sizes. Design limits of ratchet-type pawl clutch assemblies often exceed those of sprag and/or roller-style clutch assemblies of comparably sized overrunning clutches.

The typical ratchet clutch assembly includes at least one pawl which selectively locks two clutch races together in one rotational direction, and permits the races to be unlocked for free or overrunning operation in the other direction. The locking and unlocking action of the pawl may be controlled in at least one state (e.g., locked) by a spring biasing force, wherein the spring biasing force is designed to be overcome by some hydraulic, electronic, or centrifugal mechanism to achieve overrunning (e.g., unlocked state).

In clutch assemblies in which the pawls are controlled strictly by centrifugal forces to overcome spring biasing forces, certain attention must be paid to overall design/shape of the pawl and associated pocket in which the pawl is retained. As such, centrifugal forces on a pawl must be managed in a way that the pawl is not dislodged from its pocket during clutch operation, particularly at higher speeds of rotation.

Thus, enhanced pawl retention systems are desirable for assuring against such dislodgements.

SUMMARY

In one described embodiment of the disclosure, a one-way ratchet overrunning clutch includes first and second concentric races, the first race having a plurality of pockets, each pocket configured to contain a pawl, each pocket including a boss having an exterior convex surface defining an arc of about 180°. Each pawl is supported on a boss, and is adapted to ratchet about the boss to selectively lock the races together. Each pawl has a J-shaped body defined by a long leg and a short leg joined together by a hook portion, the short leg and the hook portion together defining a concave surface. The concave surface is configured to partially engage a complementary exterior convex surface of an associated boss, the concave surface defining an arc of 90° to at least 150° adapted to circumscribe an identical angular range of the convex surface of the boss.

In another described embodiment of the disclosure, a pawl for a one-way overrunning clutch is configured to ratchet between a pair of concentric clutch races for selectively locking the races together. The pawl has a J-shaped body configured for being supported on and ratcheted about a boss affixed to one of the races. The J-shaped body is defined by a long leg and a short leg joined together by a hook portion, the short leg and the hook portion together defining a concave surface configured to engage a complementary exterior convex surface of such boss. The concave surface defines an arc of 90° to at least 150° that is adapted to circumscribe an identical angular range of the convex surface of such boss.

In yet another described embodiment of the disclosure, a method of making a one-way ratchet overrunning clutch includes steps of:

forming first and second concentric races, with the first race including a pocket configured to contain a pawl;

forming a boss in the pocket, and fabricating the boss to have an exterior convex surface defining an arc of about 180°;

positioning the pawl on the boss to support ratcheting of the pawl about the boss to selectively lock the races together;

forming the pawl to have a J-shaped body defined by a long leg and a short leg joined together by a hook portion, the short leg and the hook portion together defining a concave surface; and configuring the concave surface to partially engage the exterior convex surface of the boss, with the concave surface defining an arc of 90° to at least 150° to circumscribe an identical angular range of the convex surface of the boss.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION OF ILLUSTRATED EMBODIMENTS

Figure 1:
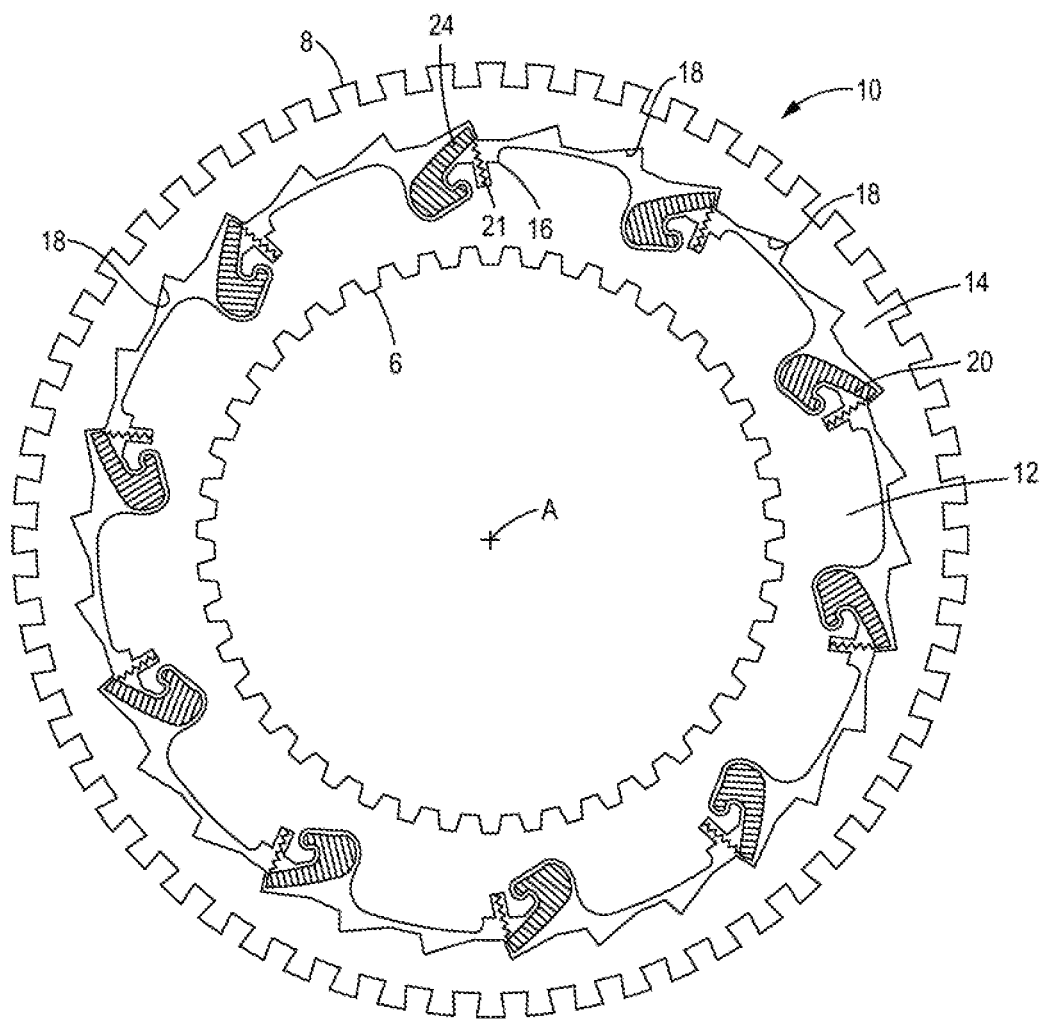
FIG. 1 illustrates a one-way ratchet overrunning clutch including races and pawls, as may be constructed in accordance with the present disclosure.

Referring initially to FIG. 1, a one-way ratchet overrunning clutch 10 is configured to control rotational movements of elements (not shown), such as transmission gears designed to engage pluralities of teeth or cogs 6 and 8 projecting from respective inner and outer races 12 and 14 of the clutch 10. In the embodiment depicted, the inner race 12 has a plurality of pockets 16, and each pocket 16 holds a pawl 20 in a circumferential array, as shown. The pawls 20 are pivotally contained in the pockets 16 of the inner race 12, and are mounted so as to swivel in the pockets as described below, and to selectively engage notches 18 in the adjacent outer race 14 for selective lock-up, or engagement, of the two races, as will be further described. The races are concentric, and may rotate about an axis "A", depicted as a point in FIG. 1, although one of the races, e.g. the outer race 14, may be grounded; i.e., be non-rotatable.

Figure 2:
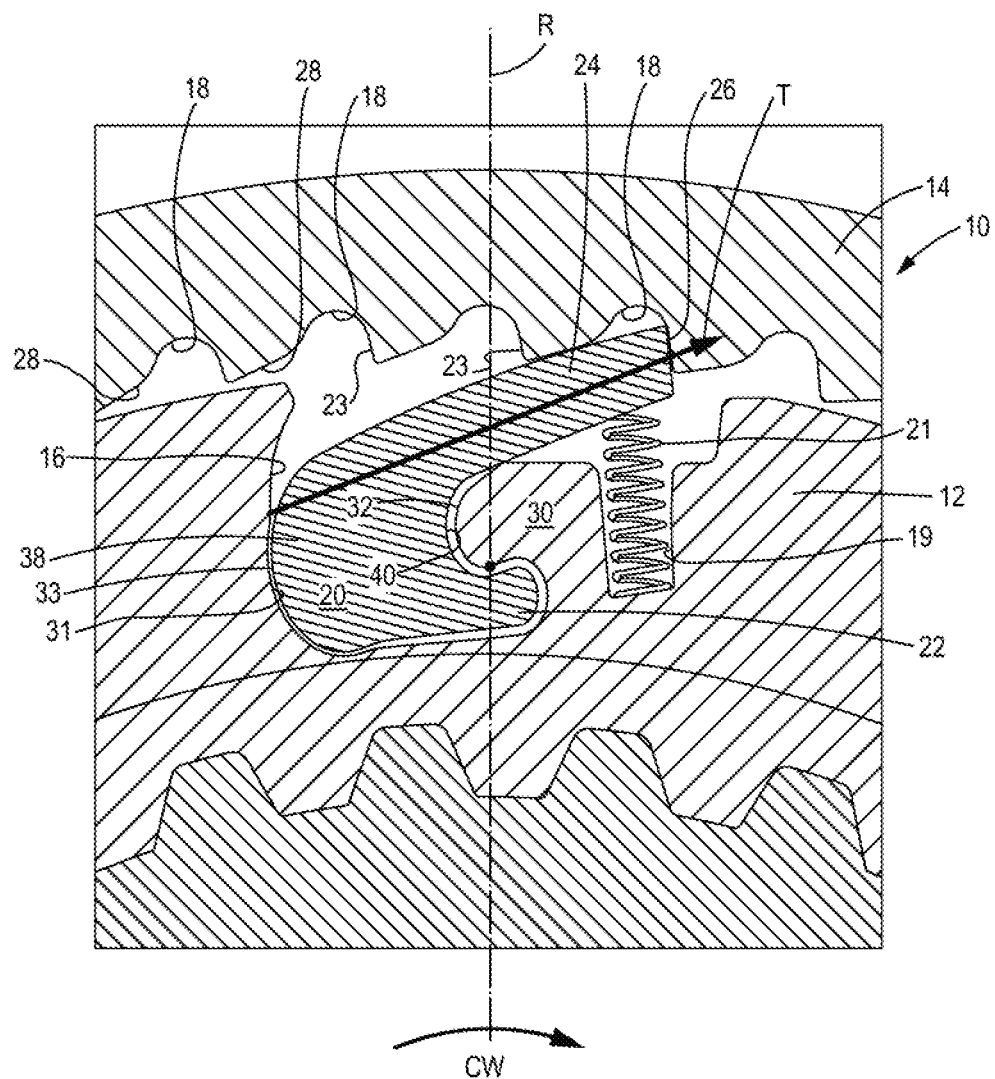
FIG. 2 is an enlarged perspective view of one embodiment of a pawl situated between the clutch races, the pawl supported in a pocket of the inner race, and positively interacting with a notch in the outer race, in accordance with one embodiment of this disclosure.

Referring now to FIG. 2, each pawl 20 has a J-shaped body, including a pair of substantially parallel but uneven legs 22 and 24, as shown. The leg 22 is a short leg which acts as part of a "J-hook" to anchor the pawl 20 on a boss 30 contained within the pocket 16. The boss 30 has an exterior convex surface defining an arc of approximately 180° about which the leg 22, which may herein be described as a "hook" leg, is configured to wrap or "hook" around the boss 30 to assure positive retention of the pawl 20 within the pocket 16.

A long leg 24 of the pawl 20 is configured to engage notches 18 when the races 12, 14 are locked together. To facilitate engagement of a notch 18 by the long leg 24, each pocket 16 includes a radially oriented spring aperture 19 from which a biasing spring 21 projects and directly pushes the long leg 24 against cams 28 and notches 18, ultimately forcing the leg to engage a notch 18 in the outer race 14, as may be appreciated by those skilled in the art.

The pawl 20 is released or disengaged from the above-described engagement by operation of centrifugal forces acting on a center of mass of the pawl, as will be described. Alternatively, disengagement of the pawl from the notch 18 could be achieved by an actuator that may, for example, be hydraulically or electrically operated.

Continuing reference to FIG. 2, each long leg 24 contains an end 26 configured to interact with a radial edge 23 of the notch 18. Thus, during clockwise movement of the inner race 12 (see arrow CW) relative to the outer race 14, a hook portion 38 of the J-shaped pawl 20 has a bottom extremity 33 that bears against a radially oriented supporting edge 31 of the pocket 16 to carry torque (see arrow T) along the leg 24 of the pawl 20 into the opposed radial edge 23 of the notch 18. As such, the torque T is carried from the inner race 12 to the outer race 14.

Figure 3:
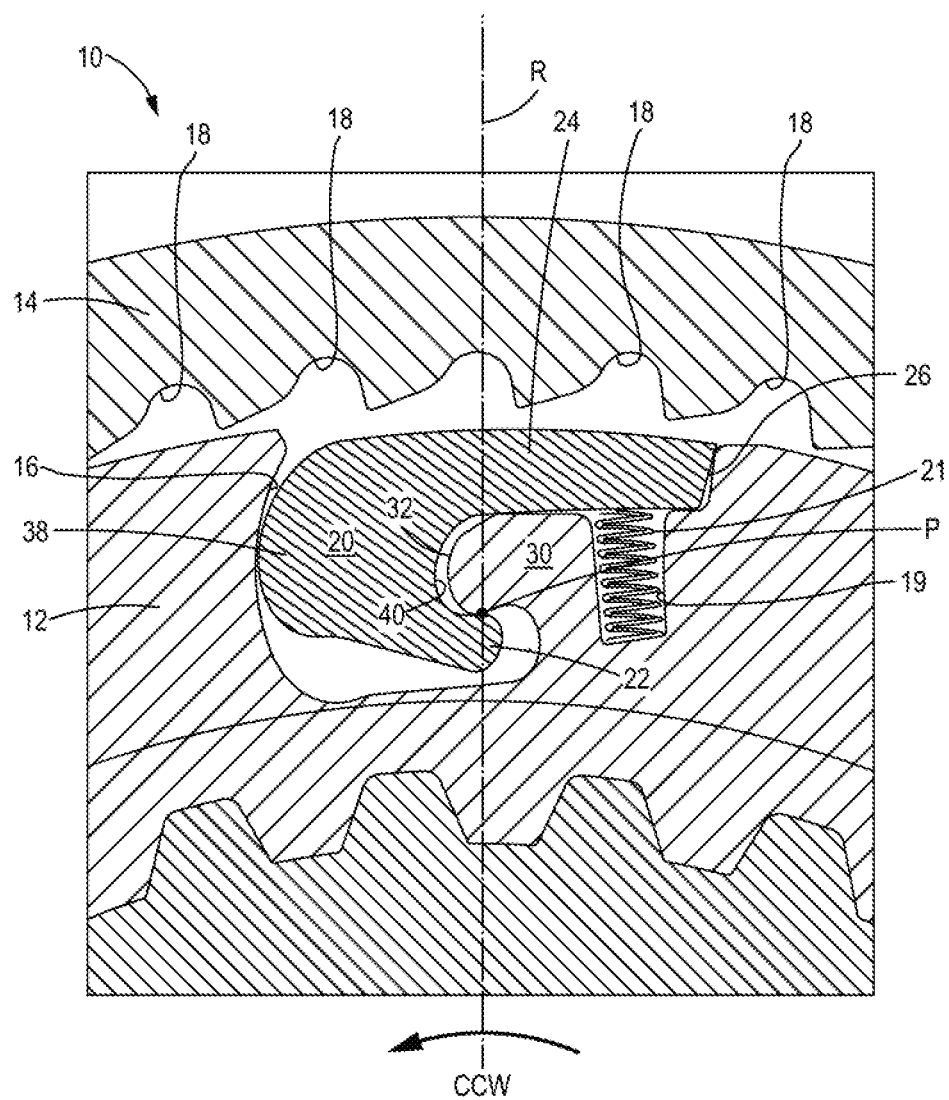
FIG. 3 is a similar view of the same embodiment of the pawl of FIG. 2, but shown in a position reflecting an overrunning mode of the clutch.

Referring now to FIG. 3, an overrunning condition of the clutch 10 is shown, in which the pawl 20 has ratcheted or shifted from the described torque bearing position of FIG. 2 in which the races 12 and 14 are shown locked together. In the overrunning state of the clutch 10, the races 12 and 14 are unlocked or disengaged, and the inner race 12 rotates counterclockwise relative to the outer race 14 (see arrow CCW). The pawl 20 has shifted or cocked clockwise about the convex boss 30 (cf. FIG. 2) into a position where it is fully retained within the pocket 16 of the inner race 12. As such, the long leg 24 is entirely disengaged from the notch 18 of the outer race 14.

Figure 4:
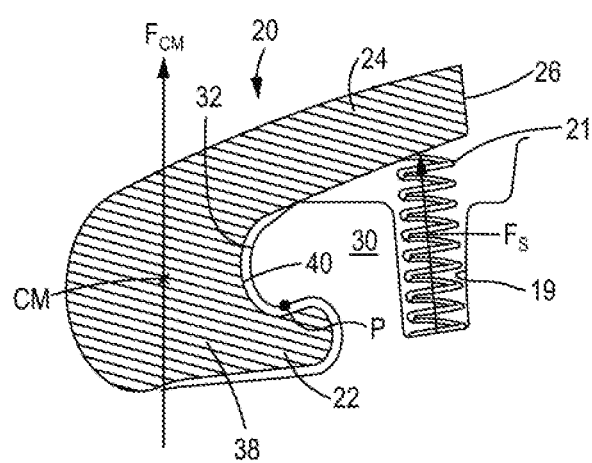
FIG. 4 is an isolated view of the pawl of FIGS. 2 and 3 to depict spring and centrifugal forces acting on the pawl during operation of the clutch of FIG. 1.

Referring now also to FIG. 4, the mechanics of pawl engagement and disengagement, based upon the configuration of the J-shaped body of the pawl 20, may be better appreciated. The J-shaped pawl 20 is designed so that its center of mass, shown as CM, is situated within the above-described hook portion 38. As a result, at a certain threshold speed of rotation of the inner race 12, an indicated centrifugal force $F_{CM}$ (shown as a force vector) will act on the center of mass to cause the pawl 20 to pivot or cock about the boss 30 at a pivot point P. This action causes the spring 21 to be compressed, permitting disengagement of the races 12, 14, as the leg 24 becomes displaced from the notch 18. It should, however, be noted that below such threshold speed, the centrifugal force $F_{CM}$ will not fully overcome the force $F_S$ of the spring 21 (also shown as a force vector). During such occasions of overrunning, the longer leg 24 will extend out of the pocket 16 and physically engage, but ratchet past, the cams and notches.

The J-shaped pawl 20 of this disclosure provides a special "J-hook" retention system wherein its hook portion 38, acting in concert with its shorter "hook" leg 22, helps to assure that the pawl 20 remains on the boss 30 under high speeds of the race 12, i.e., conditions that could dislodge the pawl 20 from its pocket 16. For this purpose, the short leg 22 and the hook portion 38 together form a concave surface 40 that defines an arc ranging from 90° to at least 150°. The concave surface 40 is configured to circumscribe an identical range of the approximately 180° exterior convex surface 32 of the boss 30 for high speed retention of the pawl 20 within the pocket 16. As described, the pivot point P (FIGS. 3 and 4) is the cocking or swivel point of contact about which the pawl 20 rotates about the boss 30. The pivot point P is located on the exterior convex surface 32 of the boss 30, and is situated physically at the bottom of the boss 30. The "hook style" engagement of the J-shaped pawl on the boss 30 assures a retention mechanism sufficient to constrain the pawl 20 from any undesirable radial translation from the pocket 16 under any anticipated centrifugal forces applied to the center of mass along a radial path R (FIG. 3).

As noted, the center of rotation is about the pivot point P. The latter is not to be confused with the center of mass (FIG. 4), the latter being spaced from the former. If the center of mass were actually coincident with the pivot point, it will be apparent to those skilled in the art that any centrifugal forces acting on the center of mass would then be ineffective to induce rotation of the pawl 20 about the boss 30 to provide overrunning.

A method of making a one-way ratchet overrunning clutch may include steps of:

forming first and second concentric races, with the first race including a pocket configured to contain a pawl;

forming a boss in the pocket, and fabricating the boss to have an exterior convex surface defining an arc of about 180°;

positioning the pawl on the boss to support ratcheting of the pawl about the boss to selectively lock the races together;

forming the pawl to have a J-shaped body defined by a long leg and a short leg joined together by a hook portion, the short leg and the hook portion together defining a concave surface; and configuring the concave surface to interact with a complementary exterior convex surface of the boss, by forming an arc on the concave surface ranging from 90° up to least 150°, the arc adapted to circumscribe an identical angular range of the convex surface of the boss.

The embodiment of the clutch shown and described herein can be useful in a wide variety of applications that may benefit from this disclosure. Although the clutch 10 may be used to control movement of gears within vehicle transmissions, other environments and uses involving selective control of clutch races may be amenable to the disclosed technology.

It is to be understood that the foregoing may be a description of only one embodiment of the disclosure. However, the disclosure is not limited to the particular embodiment(s) disclosed. For example, with appropriate modification the pawls could be contained in the outer race and be designed to interact with cams and notches situated in the inner race, instead. Moreover, statements contained in the description that relate only to particular embodiments are not to be construed as limitations on scope of the disclosure, or on definitions of terms used in the claims, except where a term or phrase may have been expressly defined. Various other embodiments, changes, and modifications to the disclosed embodiment(s) will be apparent to those skilled in the art, and are intended to fall within the spirit and scope of the appended claims.

As used in this disclosure, various terms "e.g.," "for example," "for instance," "such as," and "like," and verbs "comprising," "having," "including," and their other verb forms, when used in conjunction with a listing of one or more components or other items, are to be construed as open-ended, meaning that the listing is not to be considered as excluding other or additional components or items. All terms are to be given their broadest reasonable meanings unless used in contexts that clearly require different interpretations.

The invention claimed is:

1. A one-way ratchet overrunning clutch, the clutch comprising:
   first and second concentric races, the first race having a pocket configured to contain a pawl, the pocket including a boss having an exterior convex surface defining an arc ranging from 150° up to about 180°;
   a pawl supported on the boss, and adapted to ratchet about the boss to selectively lock the races together; the pawl comprising a J-shaped body defined by a long leg and a short leg joined together by a hook portion, the short leg and the hook portion together defining a concave surface, wherein the concave surface is configured to interact with a complementary exterior convex surface of the boss, and wherein the concave surface defines an arc ranging from 90° up to at least 150°, the arc adapted to circumscribe an identical angular range of the convex surface of the boss.

2. The clutch of claim 1, wherein the second race has a plurality of cams and notches for interacting with the pawl to lock the first and second races of the clutch together in a first rotational direction of the first race relative to the second race, and to permit overrunning of the first and second races in a second rotational direction of the first race relative to the second race.

3. The clutch of claim 1, wherein the long and short legs are spaced apart by the hook portion, and wherein the short leg is substantially parallel to the long leg.

4. The clutch of claim 3, further comprising a spring, wherein the spring generates a spring force that pushes the longer leg toward the cams and notches of the second race, and wherein the longer leg ratchets past the cams and notches during overrunning of the clutch.

5. The clutch of claim 4, wherein the hook portion has a greater body mass than the total mass of the legs, and wherein a center of mass of the pawl is situated within the hook of the pawl.

6. The clutch of claim 5, wherein at a threshold rotational speed of the first race, the center of mass of the pawl overcomes the force of the spring.

7. The clutch of claim 6, wherein at the threshold speed, the longer leg of the pawl disengages from the cams and notches to permit overrunning of the first race relative to the second race.

8. A pawl for a one-way overrunning clutch, the pawl configured to ratchet between a pair of concentric clutch races for selectively locking the races together; the pawl comprising:
   a J-shaped body configured for being supported on and ratcheted about a boss affixed to one of the races; the J-shaped body including an elongated ratchet leg and a shorter hook leg spaced apart by a hook portion, the hook leg and hook portion together defining a concave surface, wherein the concave surface is configured to interact with a complementary exterior convex surface of such boss, and wherein the concave surface defines an arc ranging from 90° up to least 150°, the arc adapted to circumscribe an identical angular range of the convex surface of such boss.

9. The pawl of claim 8, wherein the concave surface of the hook portion is configured to constrain the pawl from radial translation under centrifugal forces when the concave hook portion is engaged about such boss.

10. The pawl of claim 9, wherein the pawl is configured to be situated within a pocket of one of a pair of clutch races.

11. The pawl of claim 10, wherein the elongated ratchet leg is configured to compress a biasing spring when the pawl is subjected to centrifugal forces.

12. The pawl of claim 8, wherein the legs are integrally joined together by the hook portion.

13. The pawl of claim 8, wherein the pawl has a center of mass situated within the hook portion of the pawl.

14. The pawl of claim 13, wherein the pawl has a center of rotation, and the pawl ratchets about a center of rotation, and wherein the center of rotation is spaced from the center of mass.

15. A method of making a one-way ratchet overrunning clutch, the method comprising the steps of:
   forming first and second concentric races, with the first race including a pocket configured to contain a pawl;
   forming a boss in the pocket, and fabricating the boss to have an exterior convex surface defining an arc of about 180°;
   positioning the pawl on the boss to support ratcheting of the pawl about the boss to selectively lock the races together;
   forming the pawl to have a J-shaped body defined by a long leg and a short leg joined together by a hook portion, the short leg and the hook portion together defining a concave surface; and
   configuring the concave surface to interact with a complementary exterior convex surface of the boss, by forming an arc on the concave surface ranging from 90° up to least 150°, the arc adapted to circumscribe an identical angular range of the convex surface of the boss.

* * * * *